United States Patent
Blindt et al.

(10) Patent No.: US 11,767,949 B2
(45) Date of Patent: Sep. 26, 2023

(54) GREASE PACKING TOOL FOR A BEARING ASSEMBLY

(71) Applicant: Caterpillar Inc., Peoria, IL (US)

(72) Inventors: Todd M. Blindt, Canton, IL (US); Quinton Burcar, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 279 days.

(21) Appl. No.: 17/199,159

(22) Filed: Mar. 11, 2021

(65) Prior Publication Data

US 2022/0290808 A1 Sep. 15, 2022

(51) Int. Cl.
| F16C 43/04 | (2006.01) |
| F16N 37/00 | (2006.01) |
| F16C 33/66 | (2006.01) |

(52) U.S. Cl.
CPC ........ F16N 37/003 (2013.01); F16C 33/6622 (2013.01); F16C 43/04 (2013.01)

(58) Field of Classification Search
CPC ..... F16N 37/003; F16C 33/6622; F16C 43/04
USPC .......................................................... 184/5.1
See application file for complete search history.

(56) References Cited

U.S. PATENT DOCUMENTS

| 2,515,208 | A | * | 7/1950 | Fox | ......................... | F16C 43/04 |
| | | | | | | 141/357 |
| 2,599,456 | A | * | 6/1952 | Ivie | ..................... | F16C 33/6622 |
| | | | | | | 222/386 |
| 3,724,596 | A | * | 4/1973 | Freda | ...................... | F16C 43/04 |
| | | | | | | 184/105.1 |
| 5,709,284 | A | * | 1/1998 | Shultz, Sr. | .............. | F16N 11/02 |
| | | | | | | 222/386 |
| 2003/0029677 | A1 | * | 2/2003 | Kurtz | ........................ | F16N 3/10 |
| | | | | | | 184/5.1 |
| 2014/0318899 | A1 | * | 10/2014 | Dawson | ..................... | F16N 3/10 |
| | | | | | | 184/14 |

FOREIGN PATENT DOCUMENTS

| CN | 201232842 Y | 5/2009 |
| CN | 102494040 A | 6/2012 |
| CN | 202301493 U | 7/2012 |
| CN | 111396734 A | 7/2020 |
| CN | 211551121 U | 9/2020 |
| FR | 1223887 A | 6/1960 |
| KR | 20150006506 A | 1/2015 |

* cited by examiner

Primary Examiner — Gene O Crawford
Assistant Examiner — Emily R Kincaid

(57) ABSTRACT

A grease packing tool includes a support member and an alignment member. The support member includes a radially outward section, a radially inward section, and an annular passage. The radially outward section has an inner surface that includes an annular seat for receiving a cage of a bearing assembly. The radially inward section has an outer surface that includes an annular ledge for supporting an inner ring of the bearing assembly. The annular passage is arranged between the radially outward section and the radially inward section and is configured to deliver grease between rolling elements of the bearing assembly. The alignment member includes a projection that has an exterior surface for contacting the inner ring of the bearing assembly to ensure that the cage of the bearing assembly and the inner ring of the bearing assembly are respectively seated in the annular seat and the annular ledge.

16 Claims, 5 Drawing Sheets

GREASE PACKING TOOL FOR A BEARING ASSEMBLY

TECHNICAL FIELD

The present disclosure relates generally to a grease packing tool assembly and, for example, to a grease packing tool for a bearing assembly of a rolling element bearing.

BACKGROUND

To facilitate rotation of a component (e.g., a gear, a turbine, a rotor, and/or the like) and a shaft of a machine, a mechanic may secure one or more rolling element bearings between the shaft and a machine housing. Such bearings generally include, in addition to an outer ring, an inner ring assembly having an inner ring, a cage, and a plurality of rolling elements arranged therebetween. To limit friction between the rolling elements and a bearing race of the inner ring and/or the outer ring, the mechanic, prior to installing the bearing within the machine, may utilize a grease packing tool to inject grease between the rolling elements. As a result, the mechanic may extend a service life of the bearing and reduce costs associated with replacement and/or repair. However, because grease packing tools tend to be generically designed and shapes of the bearings may vary depending on application, the mechanic may waste time or other resources ensuring that a bearing is properly secured within the grease packing tool to enable sufficient lubrication. In some cases, due to its generic design, the grease packing tool may be incapable of directing lubricant to critical functional surfaces of rolling element bearings. Additionally, because grease packing tools tend to apply a clamping force directly onto the cage of the bearing, which is a precise component, a grease packing tool may bend or otherwise damage the cage during the lubrication process.

KR2015/006506A discloses a grease filling device for a tapered roller bearing. The device comprises a work table on which a through-hole is formed, a rotating member rotatably coupled to the through-hole and bearing the bearing, a driving unit generating a rotating force, a grease injecting mechanism for forming a receiving space for accommodating the bearing by covering the bearing seated on the rotating member, and an elevating mechanism for raising and lowering the grease injecting mechanism.

The grease packing tool of the present disclosure solves one or more of the problems set forth above and/or other problems in the art.

SUMMARY

In some implementations, a grease packing tool for a bearing assembly includes a support member including: a radially outward section having an inner surface, the inner surface including an annular seat for receiving a cage of the bearing, a radially inward section having an outer surface, the outer surface including an annular ledge for supporting an inner ring of the bearing, and an annular passage that is arranged between the radially outward section and the radially inward section and is configured to deliver grease between rolling elements of the bearing assembly; and an alignment member including: a projection having an exterior surface, the exterior surface being configured to contact the inner ring of the bearing assembly to ensure that the cage of the bearing assembly and the inner ring of the bearing assembly are respectively seated in the annular seat and the annular ledge.

In some implementations, a grease packing tool assembly for a bearing assembly includes a support member including: an annular seat for receiving a cage of the bearing assembly, an annular ledge for supporting an inner ring of the bearing assembly, and an annular passage that is arranged between the annular seat and the annular ledge and is configured to deliver grease between rolling elements of the bearing assembly; an alignment member that is configured to contact the inner ring of the bearing assembly to ensure that the cage of the bearing assembly and the inner ring of the bearing assembly are respectively seated in the annular seat and the annular ledge; and an attachment member that is configured to attach the support member to the alignment member to removably secure the bearing assembly therebetween.

In some implementations, a method of lubricating a bearing assembly, which includes an inner ring, a cage, and a plurality of rolling elements arranged between the inner ring and the cage, includes providing a grease packing tool that includes a support member and an alignment member, the support member including: an annular seat, an annular ledge, and an annular passage that is arranged between the annular seat and the annular; positioning the bearing assembly between the support member and the alignment member of the grease packing tool such that the cage and the inner ring respectively contact the annular seat and the annular ledge of the support member; and injecting grease into the annular passage to deliver grease between the plurality of rolling elements of the bearing assembly.

DETAILED DESCRIPTION

Figure 1:
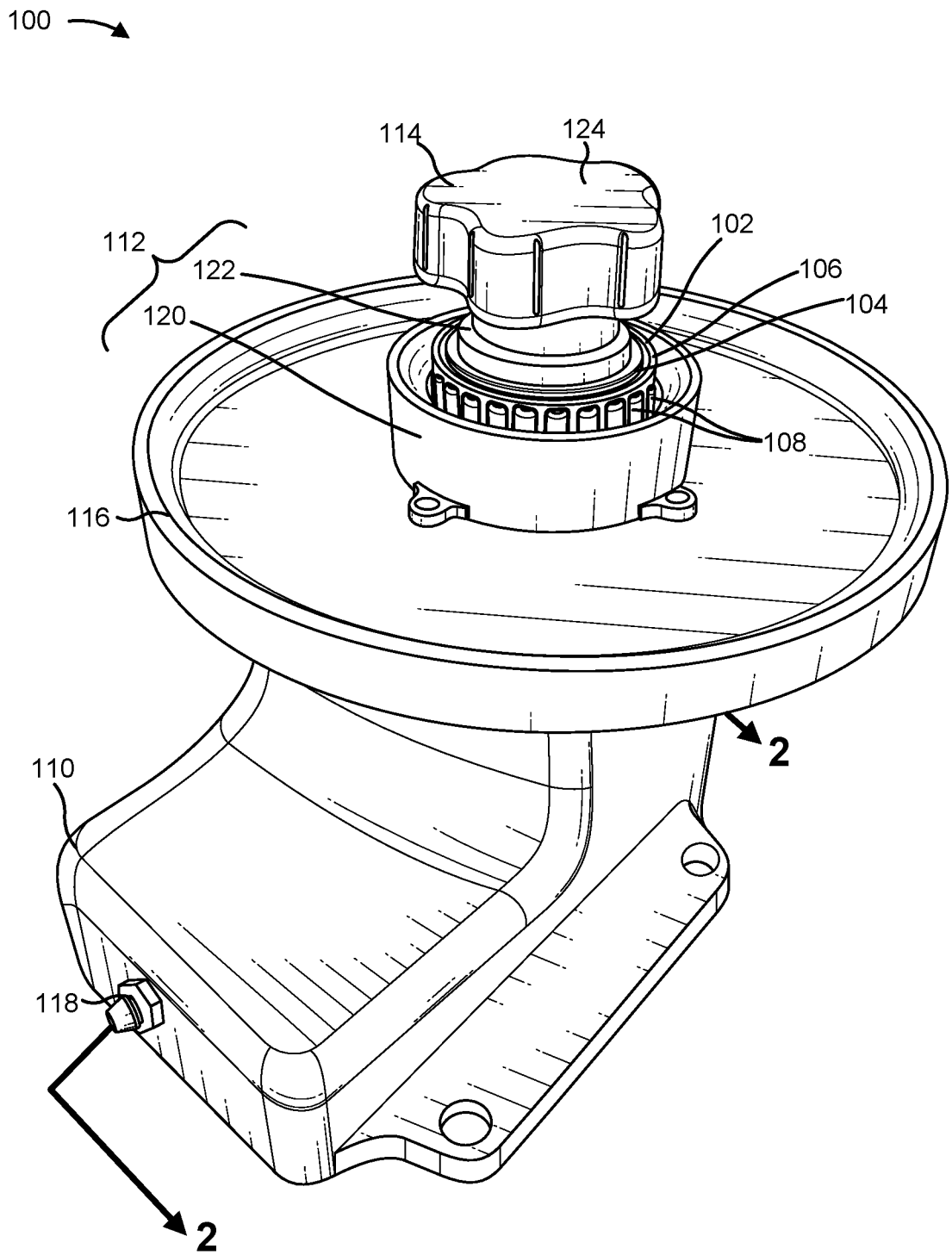
FIG. 1 is an isometric view of an exemplary grease packing tool assembly in engagement with a bearing assembly.
Figure 2:
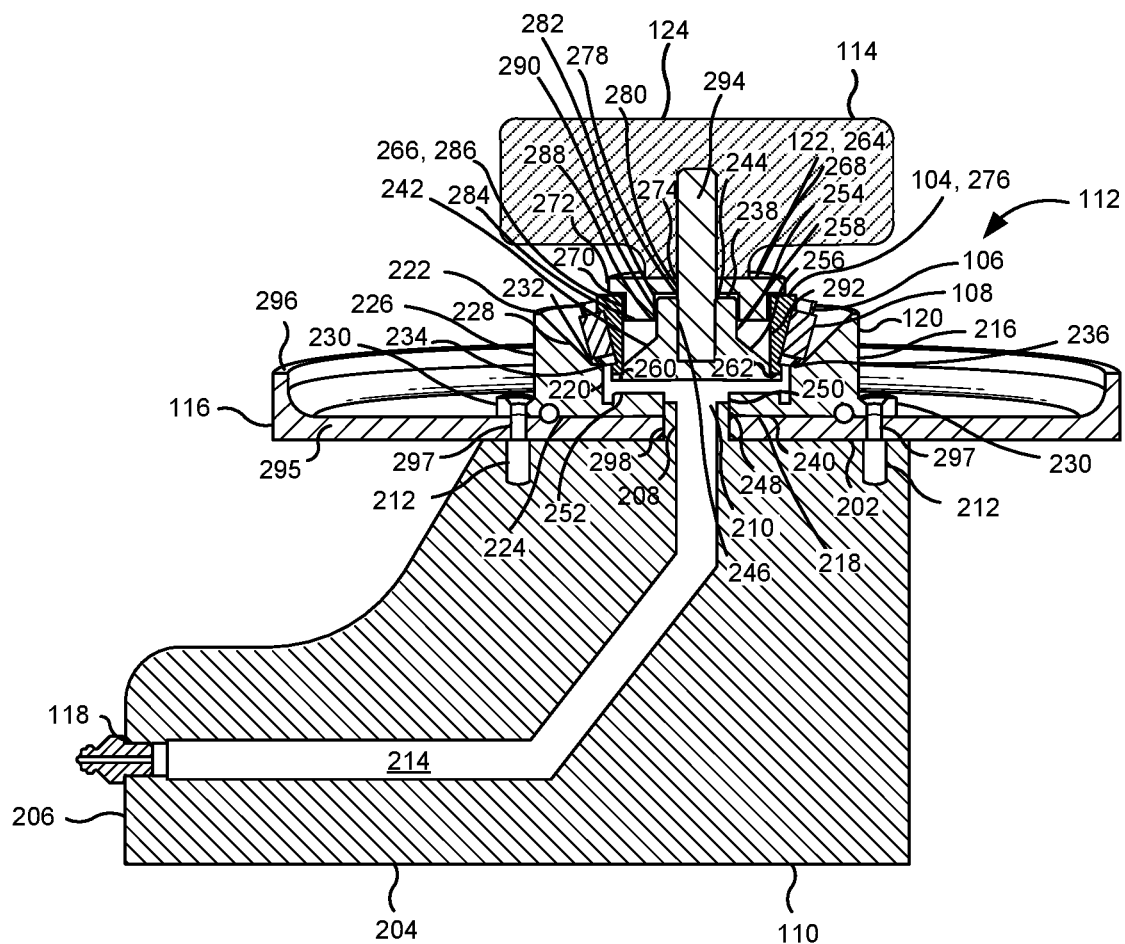
FIG. 2 is a cross-sectional view of the grease packing tool assembly in engagement with the bearing assembly, taken along lines 2-2 of FIG. 1.
Figure 3:
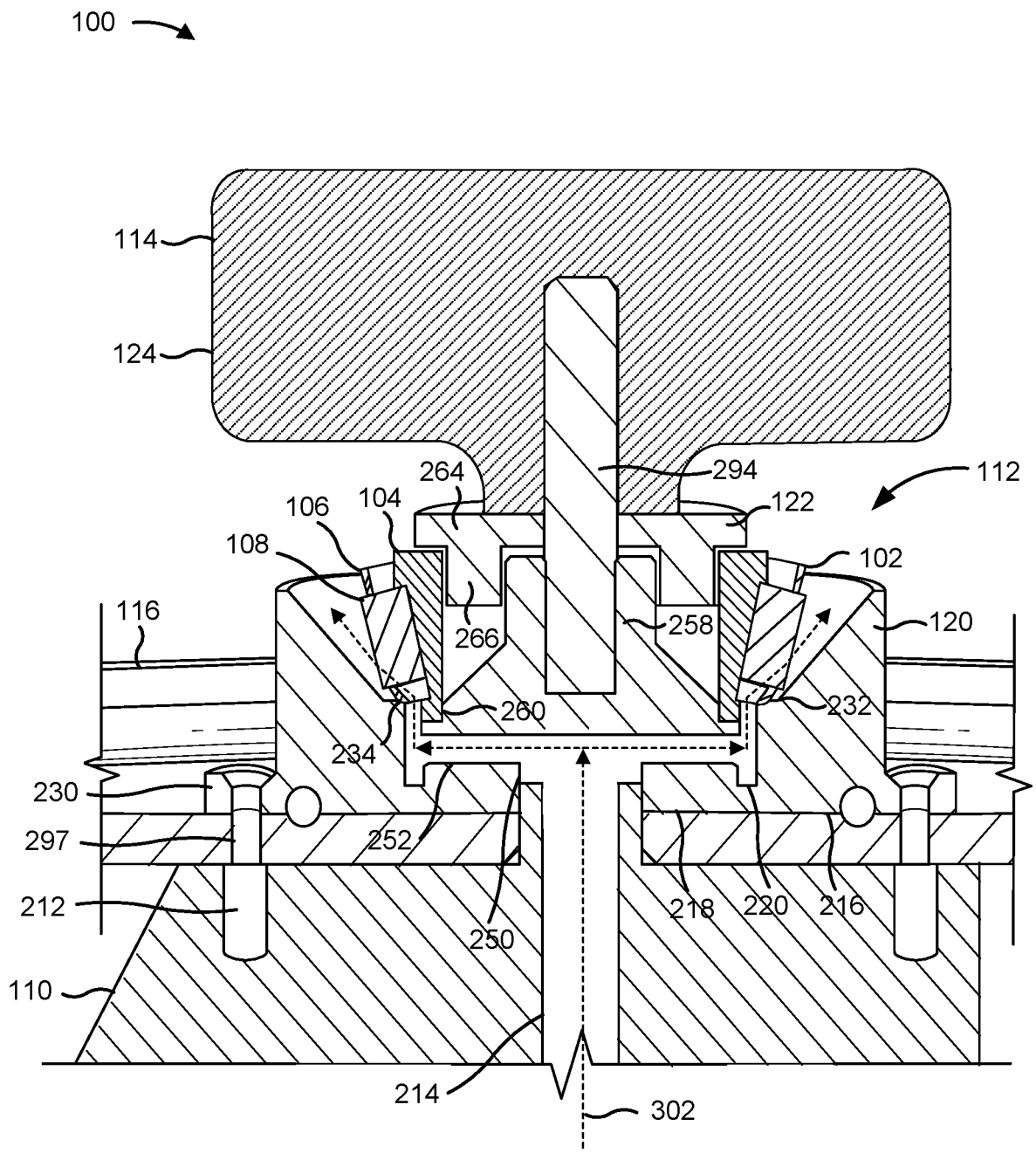
FIG. 3 is an enlarged cross-sectional view of the grease packing tool assembly in engagement with the bearing assembly, taken along lines 2-2 of FIG. 1.

This disclosure relates to a grease packing tool, which is applicable to multiple types of bearings. While the grease packing tool, as shown in FIGS. 1-3, is configured to lubricate a bearing assembly of a tapered roller bearing, other types of bearings are contemplated. For example, the grease packing tool may be configured to lubricate a bearing assembly of a spherical roller bearing, a cylindrical roller bearing, a deep-groove ball bearing, a self-aligning ball bearing, an angular contact ball-bearing, a thrust ball bearing, or another type of bearing.

To simplify the explanation below, the same reference numbers may be used to denote like features. The drawings may not be to scale.

FIG. 1 depicts an exemplary grease packing tool assembly 100 in engagement with a bearing assembly 102. The bearing assembly 102 is an inner ring assembly of a bearing that is configured to facilitate rotation between components of a machine (not shown). The bearing assembly 102, which may be a tapered cone assembly that is configured to engage a complementary outer ring of the bearing (not shown), includes an inner ring 104, a cage 106, and a plurality of rolling elements 108 retained around the inner ring 104 by the cage 106. Depending on application, the bearing assembly 102 may have an outer diameter less than or equal to approximately 200 mm. However, other dimensions are contemplated.

The grease packing tool assembly 100 is an apparatus that is configured to lubricate the plurality of rolling elements 108, prior to installation of the bearing assembly 102 within the machine. The grease packing tool assembly 100 includes a base member 110, a grease packing tool 112, an attachment member 114, and a grease pan 116. The base member 110 is a structure that supports the grease pan 116, the grease packing tool 112, the attachment member 114, and, when the grease packing tool assembly 100 is in use, the bearing assembly 102. As will be described below, the base member 110 includes a side opening 118 (e.g., a threaded zerk opening) that is configured to receive grease from a grease gun or another grease source (not shown) and route the grease to the grease packing tool 112. The grease packing tool 112 is a tool that is specifically shaped and sized to engage the bearing assembly 102. In other words, the grease packing tool 112 has an internal geometry that is tailored to match with a specific geometry of the bearing assembly 102 (e.g., based on an industry part number, a bearing type, and/or a size of the bearing assembly 102). As will be further described below, the grease packing tool 112 includes a support member 120 and an alignment member 122 that are configured to secure the bearing assembly 102 therebetween to introduce the grease into the bearing assembly 102. The attachment member 114, which may include a handle 124, is configured to removably secure the bearing assembly 102 between the support member 120 and the alignment member 122. The grease pan 116 is removably mounted between the grease packing tool 112 and the base member 110 to capture an excess amount of the grease flowing through the bearing assembly 102.

As indicated above, FIG. 1 is provided as an example. Other examples may differ from what is described with regard to FIG. 1. For example, the number and arrangement of components may differ from that shown in FIG. 1. Thus, there may be additional components, fewer components, different components, differently shaped components, differently sized components, and/or differently arranged components than those shown in FIG. 1. For example, in some implementations, to simplify assembly, at least one of the grease pan 116 or the base member 110 may be eliminated from grease packing tool assembly 100. As another example, the base member 110 may be in the form of a workbench or tabletop.

FIGS. 2-3 depict additional details of the grease packing tool assembly 100 in engagement with the bearing assembly 102. In the description to follow, in addition to the overall functionality of the grease packing tool assembly 100, the structure of the base member 110, the grease packing tool 112, the attachment member 114, and the grease pan 116 will each be described in turn.

The base member 110 includes a top surface 202, a bottom surface 204, and a side surface 206 that connects the top surface 202 to the bottom surface 204. The top surface 202 includes a protuberance 208, which has a top opening 210, and a plurality of threaded recesses 212. The bottom surface 204 is substantially planar and configured to be mounted and/or attached to a work surface (e.g., of a workbench or tabletop, not shown). The side surface 206 includes the side opening 118, which fluidly communicates with the top opening 210 to define a channel 214 for the grease to flow therealong into the support member 120 of the grease packing tool 112.

As indicated above, the grease packing tool 112 includes the support member 120 and the alignment member 122. The support member 120, which may be made of a single, integral piece of material, includes a radially outward section 216, a radially inward section 218, and an annular passage 220 arranged therebetween. The radially outward section 216 of the support member 120 includes an upper surface 222, a lower surface 224, an outer surface 226 connecting the upper surface 222 to the lower surface 224, and an inner surface 228 that is opposite to the outer surface 226. The upper surface 222 may be substantially planar and annular, and the lower surface 224 may be substantially planar and circular. The outer surface 226, which may be substantially cylindrical, includes a plurality of mounting flanges 230 to respectively align with the plurality of threaded recesses 212 for attachment to the base member 110 (e.g., via a plurality of threaded fasteners, such as bolts and/or screws). The inner surface 228, which may be tapered, includes an inner ledge 232 having an inner seat 234 for receiving an end portion 236 of the cage 106 of the bearing assembly 102. Because the end portion 236 of the cage 106 is annular, the inner ledge 232 and the inner seat 234 may likewise be annular to ensure that the grease is constrained to flow between the cage 106 and the inner ring 104 of the bearing assembly 102.

The radially inward section 218 of the support member 120 includes a top surface 238, a bottom surface 240 that is opposite to the top surface 238, and an outer surface 242 that extends from the top surface 238 toward the bottom surface 240. The top surface 238 is substantially planar and includes a top opening 244 which communicates with a threaded bore 246 axially extending into the radially inward section 218. The bottom surface 240, which is co-planar with the lower surface 222, includes a bottom opening 248 that is configured to receive the protuberance 208 of the base member 110 (e.g., to minimize leakage of the grease flowing from the base member 110 into the support member 120). The bottom opening 248 fluidly communicates with an axial passage 250 that extends axially into the radially inward section 218 toward the threaded bore 246. The axial passage 250, in turn, fluidly communicates with a plurality of radial passages 252, which connect the axial passage 250 to the annular passage 220. The outer surface 226 includes a cylindrical portion 254 and a tapered portion 256. The cylindrical portion 254 of the outer surface 242, along with the top surface 238, define an upper portion 258 of the radially inward section 218 that is configured to be received by the alignment member 122. The tapered portion 256 includes an outer ledge 260 for supporting a first end surface 262 of the inner ring 104 of the bearing assembly 102. Because the inner ring 104 is annular, the outer ledge 260 may likewise be annular to ensure that the grease is constrained to flow between the cage 106 and the inner ring 104 of the bearing assembly 102. Due to the shape of the bearing assembly 102, a distance between the outer ledge 260 and the bottom surface 240 may be less than a distance between the inner seat 234 and the lower surface 222.

The alignment member 122, which may be made of a single, integral piece of material, includes a body 264 and a projection 266 extending axially from the body 264. The body 264 of the alignment member 122, which may be substantially cylindrical, includes an upper surface 268, a lower surface 270, and an outer surface 272 connecting the upper surface 268 to the lower surface 270. The upper surface 268 includes an upper opening 274. The lower surface 270, which is configured to contact a second end surface 276 of the inner ring 104 of the bearing assembly 102, includes a lower opening 278 that fluidly communicates with the upper opening 274 to define a through-hole 280, which may be unthreaded. To cooperate with the threaded bore 246 to receive part of the attachment member 114, as will be described below, the through-hole 280 has a diameter that is substantially equal to a diameter of the threaded bore 246.

The projection 266 of the alignment member 122, which may be substantially cylindrical, includes an upper end 282, a lower end 284, and an exterior surface 286 connecting the upper end 282 to the lower end 284. The upper end 282 is adjacent to the lower surface 270 of the body 264. The lower end 284 includes a lower opening 288 that fluidly communicates with an aperture 290 that extends axially into the projection 266 toward the lower surface 270 of the body 264. To ensure proper positioning of the alignment member 122 relative to the support member 120, the aperture 290 is configured to receive the upper portion 258 of the radially inward section 218 of the support member 120. Thus, the aperture 290 may have a diameter that is substantially equal to a diameter of the upper portion 258. The exterior surface 286, which has a length that is less than or equal to a length of the upper portion 258 of the radially inward section 218 of the support member 120, is configured to contact an inner surface 292 of the inner ring 104.

The attachment member 114 includes, in addition to the handle 124, a threaded shaft 294 that is configured to be inserted into the through-hole 280 and the threaded bore 246 to secure the bearing assembly 102 between the alignment member 122 and the support member 120. The threaded shaft 294 may be secured within the handle 124 via a threaded engagement, a friction-fit engagement, or another type of engagement. Alternatively, threaded shaft 294 may be integrally formed with the handle 124.

The grease pan 116 includes a plate 295 and a peripheral rim 296 extending axially from and the plate 295. The plate 295 includes a plurality of threaded holes 297 and a central hole 298. The plurality of threaded holes 297 are arranged to respectively align with the plurality of mounting flanges 230 and the plurality of threaded recesses 212 for attachment between the support member 120 and the base member 110 (e.g., via the plurality of threaded fasteners, described above). The central hole 298 is configured to be aligned with the bottom opening 248 of the support member 120 to receive the protuberance 208 of the base member 110. In order to collect an excess amount of the grease flowing through the bearing assembly 102 and out of the support member 120, the grease pan 116 has a diameter that is greater than an outer diameter of the support member 120.

In use, to lubricate the bearing assembly 102, a mechanic first selects the grease packing tool 112, which is specifically sized and shaped to correspond to the bearing assembly 102 (e.g., based on an industry part number, a bearing type, and/or a size of the bearing assembly 102). The mechanic then attaches the support member 120 of the grease packing tool 112 to the grease pan 116 and the base member 110 by aligning the plurality of mounting flanges 230, the plurality of threaded holes 297, and the plurality of threaded recesses 212, and inserting the plurality of threaded fasteners therethrough. Once the support member 120 is secured in place, the mechanic places the bearing assembly 102 onto the support member 120 such that the end portion 236 of the cage 106 is seated in the inner seat 234 and the first end surface 262 of the inner ring 104 contacts the outer ledge 260. To ensure that the bearing assembly 102 is properly seated on the support member 120 prior to being clamped, the mechanic places the alignment member 122 on the bearing assembly 102 such that the exterior surface 286 and the lower surface 270 of the alignment member 122 respectively contact the inner surface 292 and the second end surface 276 of the inner ring 104. To secure the bearing assembly 102 between the support member 120 and the alignment member 122, the mechanic then rotatably inserts the threaded shaft 294 into the through-hole 280 of the alignment member 122 and the threaded bore 246 of the support member 120 by pushing and twisting the handle 124. While the attachment member 114 presses the alignment member 122 against the support member 120, the alignment member 122 and the support member 120 apply a clamping force onto the inner ring 104 of the bearing assembly 102.

With the grease packing tool assembly 100 engaged with the bearing assembly 102, the mechanic injects grease into the side opening 118 of the base member 110 (e.g., by depressing a trigger on a grease gun, activating a grease pump, and/or the like). As the grease is injected into the base member 110 and as illustrated by exemplary path 302 of FIG. 3, the grease flows sequentially through the channel 214, the axial passage 250, the plurality of radial passages 252, and the annular passage 220 to pass between the plurality of rolling elements 108. While the grease passes between the plurality of rolling elements 108, the grease tends to collect on and around the plurality of rolling elements 108, providing lubrication thereto. Once the grease exits the bearing assembly 102 and flows onto the inner surface 228 of the support member 120 and/or the plate 295 of the grease pan 116, the mechanic may determine that that the bearing assembly 102 is sufficiently lubricated and remove the bearing assembly 102 from the grease packing tool assembly 100 and install the bearing assembly 102 into a machine as desired.

As indicated above, FIGS. 2-3 are provided as an example. Other examples may differ from what is described with regard to FIGS. 2-3. For example, the number and arrangement of components may differ from that shown in FIGS. 2-3. Thus, there may be additional components, fewer components, different components, differently shaped components, differently sized components, and/or differently arranged components than those shown in FIGS. 2-3. For example, rather than the alignment member 122 having the aperture 290 that receives the upper portion 258 of the radially inward section 218, the alignment member 122 may have a protrusion that is received within a corresponding aperture in the upper portion 258 of the radially inward section 218. As another example, the handle 124 may be replaced with a wing nut or another device that is designed to be hand-tightened (e.g., so as to avoid overtightening the attachment member 114, which may unintentionally bend the cage 106).

Figure 4:
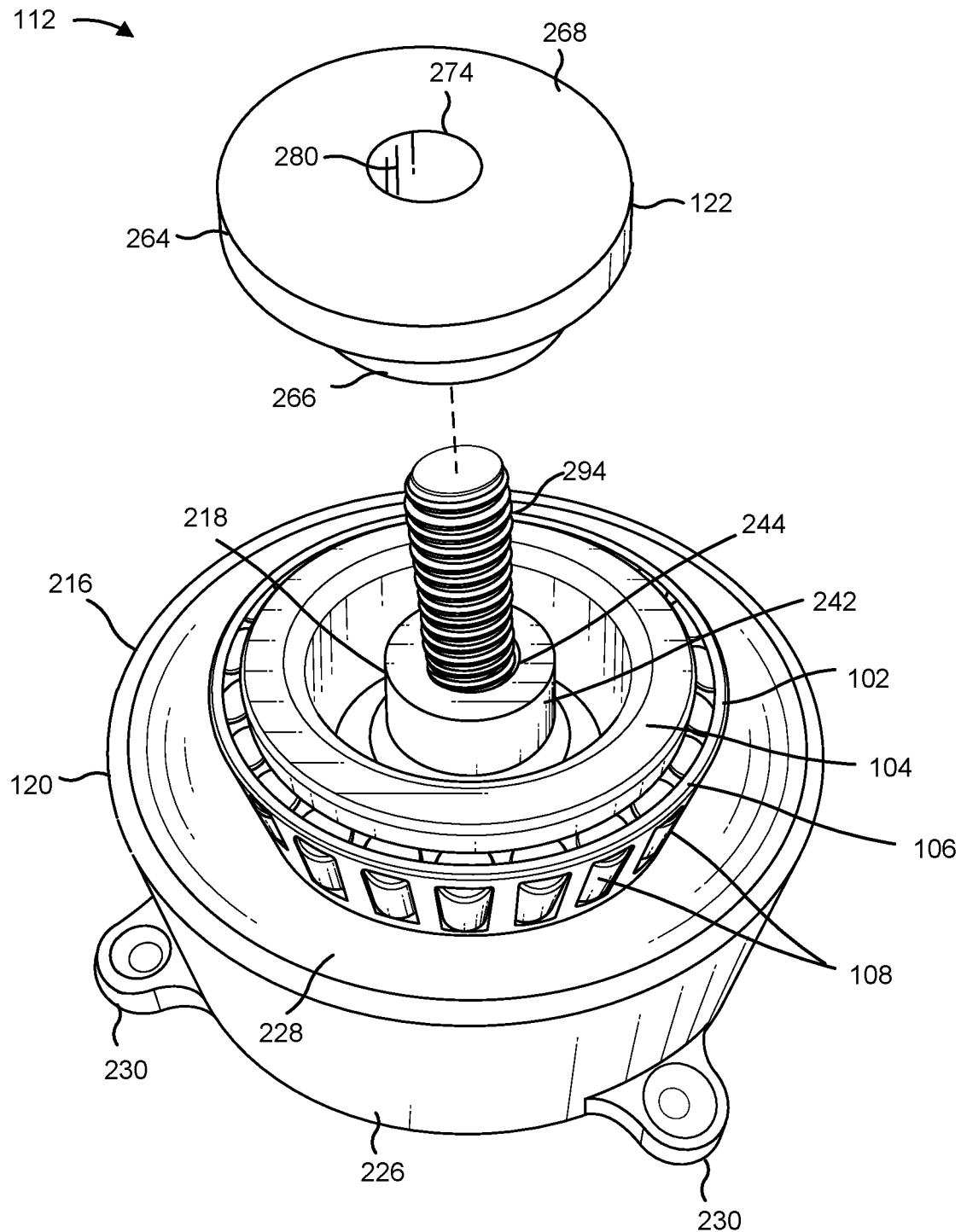
FIG. 4 is an isometric, exploded view of a grease packing tool of the grease packing tool assembly.

FIG. 4 depicts, for simplicity, the grease packing tool 112, the threaded shaft 294, and the bearing assembly 102 without other components of the grease packing tool assembly 100. As indicated above, the support member 120 and the alignment member 122 together form a set that is specifically designed to deliver grease to the bearing assembly 102. Thus, it should be understood that the structure of the support member 120 and the alignment member 122 may be varied to accommodate other types, sizes, and/or shapes of bearing assemblies while having substantially the same structure and functionality as described above. Furthermore, to reduce costs associated with manufacturing different grease packing tools that correspond to different bearings, the support member 120 and the alignment member 122, as well as other variants thereof, may be made of a relatively inexpensive material (e.g., a non-metallic material, such as plastic).

As indicated above, FIG. 4 is provided as an example. Other examples may differ from what is described with regard to FIG. 4. For example, the number and arrangement of components may differ from that shown in FIG. 4. Thus, there may be additional components, fewer components, different components, differently shaped components, differently sized components, and/or differently arranged components than those shown in FIG. 4. For example, rather than the alignment member 122 having the aperture 290 that receives the upper portion 258 of the radially inward section 218, the alignment member 122 may have a protrusion that is received within an aperture in the upper portion 258 of the radially inward section 218. As another example, the handle 124 may be replaced with a wing nut or another device that is designed to be hand-tightened.

Figure 5:
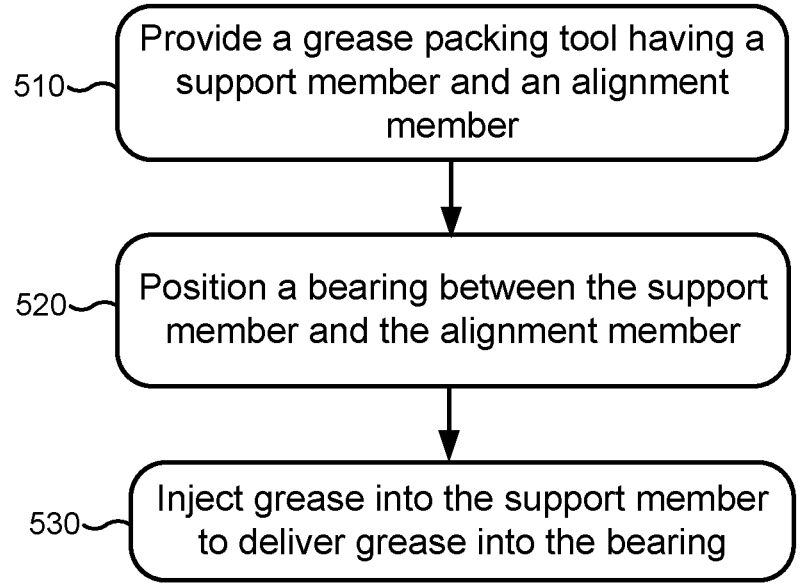
FIG. 5 is a flowchart of an exemplary method of lubricating a bearing assembly.

FIG. 5 is a flowchart of an exemplary method 500 of lubricating a bearing assembly. The bearing assembly may include an inner ring, a cage, and a plurality of rolling elements arranged between the inner ring and the cage.

As shown in FIG. 5, method 500 may include providing a grease packing tool having a support member and an alignment member (block 510). The support member may include an annular seat, an annular ledge, and an annular passage that is arranged between the annular seat and the annular ledge. The support member may further include an axial passage and a plurality of radial passages extending between the axial passage and the annular passage.

As further shown in FIG. 5, method 500 may include positioning the bearing assembly between the support member and the alignment member (block 520). The bearing assembly may be positioned such that the cage and the inner ring respectively contact the annular seat and the annular ledge of the support member.

As further shown in FIG. 5, method 500 may include injecting grease into the support member to deliver the grease into the bearing assembly (block 530). Injecting the grease into the support member may include injecting the grease into the annular passage to deliver the grease between the plurality of rolling elements of the bearing assembly. Injecting the grease into the annular passage may include injecting the grease into the channel of the base member to cause the grease to flow, sequentially, through the axial passage, the plurality of radial passages, the annular passage, and the bearing assembly.

In some implementations, method 500 may further include manufacturing, prior to providing the grease packing tool, the grease packing tool based on dimensions of the bearing assembly.

In some implementations, method 500 may further include inserting, prior to injecting the grease into the annular passage, a threaded shaft into a through-hole of the alignment member and a threaded bore of the support member to cause the grease packing tool to apply a clamping force on the inner ring of the bearing.

In some implementations, method 500 may further include securing, prior to injecting the grease into the annular passage, the support member to a base member, the base member including a channel that fluidly communicates with the axial passage. Securing the support member may include: positioning a grease pan between the support member and the base member such that a hole of the grease pan is axially aligned between the axial passage and the channel; and securing the support member, the grease pan, and the base member together with one or more fasteners.

Although FIG. 5 shows example blocks of method 400, in some implementations, method 500 may include additional blocks, fewer blocks, different blocks, or differently arranged blocks than those depicted in FIG. 5. Additionally, or alternatively, two or more of the blocks of method 500 may be performed in parallel.

INDUSTRIAL APPLICABILITY

The grease packing tool 112 of the present disclosure is particularly applicable to a machine element that reduces friction between moving parts, such as the bearing assembly 102. For example, the grease packing tool 112 may be configured to lubricate a bearing assembly of a tapered roller bearing, a spherical roller bearing, a cylindrical roller bearing, a deep-groove ball bearing, a self-aligning ball bearing, an angular contact ball-bearing, a thrust ball bearing, or another type of bearing.

Because the internal geometry of the grease packing tool 112 is specifically tailored to engage the geometry of the bearing assembly 102 (e.g., based on an industry part number, a bearing type, and/or a size of the bearing assembly 102), a mechanic utilizing the grease packing tool 112 may conserve time or other resources that might have otherwise been consumed attempting to fit the bearing assembly 102 within a generically-designed and/or ill-fitting grease packing tool. In other words, the grease packing tool 112 may yield faster and more successful results in lubricating the bearing assembly 102. As a result, the grease packing tool 112 is well-suited for high volume operations. Furthermore, due to the customized shape of the grease packing tool 112, additional types, sizes, and/or shapes of bearings may be lubricated that otherwise may have been incapable of use with other grease packing tools. Additionally, because the grease packing tool 112 is designed to apply a clamping force onto the inner ring 104 of the bearing assembly 102, rather than the cage 106 (a functionality which is further ensured by including a hand-tightening device on the attachment member 114, which limits a possibility of overtightening), the grease packing tool 112 is less likely to bend and/or damage the cage 106 during the lubrication process.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A grease packing tool for a bearing assembly, the grease packing tool comprising:
   a support member including:
      a radially outward section having an inner surface, the inner surface including an annular seat for receiving a cage of the bearing assembly,
      a radially inward section having an outer surface, the outer surface including an annular ledge for supporting an inner ring of the bearing assembly, and
      an annular passage that is arranged between the radially outward section and the radially inward section and is configured to deliver grease between rolling elements of the bearing assembly; and
   an alignment member including:
      a projection having an exterior surface, the exterior surface being configured to contact the inner ring of the bearing assembly to ensure that the cage of the bearing assembly and the inner ring of the bearing assembly are respectively seated in the annular seat and the annular ledge, wherein
      the radially outward section has a lower surface, and the radially inward section has a bottom surface that is coplanar with the lower surface.

2. The grease packing tool of claim 1, wherein the radially inward section further includes a plurality of radial passages that fluidly communicate with the annular passage.

3. The grease packing tool of claim 2, wherein the radially inward section further includes an axial passage that fluidly communicates with the plurality of radial passages.

4. The grease packing tool of claim 1, wherein the alignment member further includes a body having a lower surface, the lower surface being configured to contact the inner ring of the bearing assembly to ensure that the cage of the bearing assembly and the inner ring of the bearing assembly are respectively seated in the annular seat and the annular ledge.

5. The grease packing tool of claim 1, wherein a distance between the annular seat and the lower surface is greater than a distance between the annular ledge and the bottom surface.

6. The grease packing tool of claim 1, wherein the support member and the alignment member are made of a non-metallic material.

7. A grease packing tool assembly for a bearing assembly, the grease packing tool assembly comprising:
   a support member including:
      an annular seat for receiving a cage of the bearing assembly,
      an annular ledge for supporting an inner ring of the bearing assembly, and
      an annular passage that is arranged between the annular seat and the annular ledge and is configured to deliver grease between rolling elements of the bearing assembly;
   an alignment member that is configured to contact the inner ring of the bearing assembly to ensure that the cage of the bearing assembly and the inner ring of the bearing assembly are respectively seated in the annular seat and the annular ledge; and
   an attachment member that is configured to attach the support member to the alignment member to removably secure the bearing assembly therebetween, wherein the alignment member includes an aperture that is configured to receive an upper portion of the support member.

8. The grease packing tool assembly of claim 7, wherein the attachment member includes a threaded shaft.

9. The grease packing tool assembly of claim 8, wherein the support member includes a threaded bore, and the alignment member includes a through-hole that is axially aligned with the threaded bore to removably receive the threaded shaft.

10. The grease packing tool assembly of claim 8, wherein the attachment member further includes a handle that engages the threaded shaft to attach the support member to the alignment member.

11. The grease packing tool assembly of claim 7, wherein the support member further includes:
   an axial passage, and
   a plurality of radial passages extending between the axial passage and the annular passage;
   the grease packing tool assembly further comprises a base member having a channel that is configured to fluidly communicate with the axial passage.

12. The grease packing tool assembly of claim 11, wherein the support member includes a plurality of mounting flanges to removably attach the support member to the base member.

13. A method of lubricating a bearing assembly that includes an inner ring, a cage, and a plurality of rolling elements arranged between the inner ring and the cage, the method comprising:
   providing a grease packing tool that has a support member and an alignment member, the support member including:
      an annular seat,
      an annular ledge, and
      an annular passage that is arranged between the annular seat and the annular ledge;
   positioning the bearing assembly between the support member and the alignment member of the grease packing tool such that the cage and the inner ring respectively contact the annular seat and the annular ledge of the support member; and
   injecting grease into the annular passage to deliver the grease between the plurality of rolling elements of the bearing assembly,
   wherein the support member further includes:

an axial passage, and
a plurality of radial passages extending between the axial passage and the annular passage; and
prior to injecting the grease into the annular passage, the method further comprises:
securing the support member to a base member, the base member including a channel that fluidly communicates with the axial passage,
wherein securing the support member to the base member comprises:
positioning a grease pan between the support member and the base member such that a hole of the grease pan is axially aligned between the axial passage and the channel, and
securing the support member, the grease pan, and the base member together with one or more fasteners.

14. The method of claim 13, wherein, prior to providing the grease packing tool, the method comprises:
manufacturing the grease packing tool based on dimensions of the bearing assembly.

15. The method of claim 13, wherein, prior to injecting the grease into the annular passage, the method comprises:
inserting a threaded shaft into a through-hole of the alignment member and a threaded bore of the support member to cause the grease packing tool to apply a clamping force on the inner ring of the bearing assembly.

16. The method of claim 13, wherein injecting the grease into the annular passage includes injecting the grease into the channel of the base member to cause the grease to flow, sequentially, through the axial passage, the plurality of radial passages, the annular passage, and the bearing assembly.

* * * * *